Figure 1:
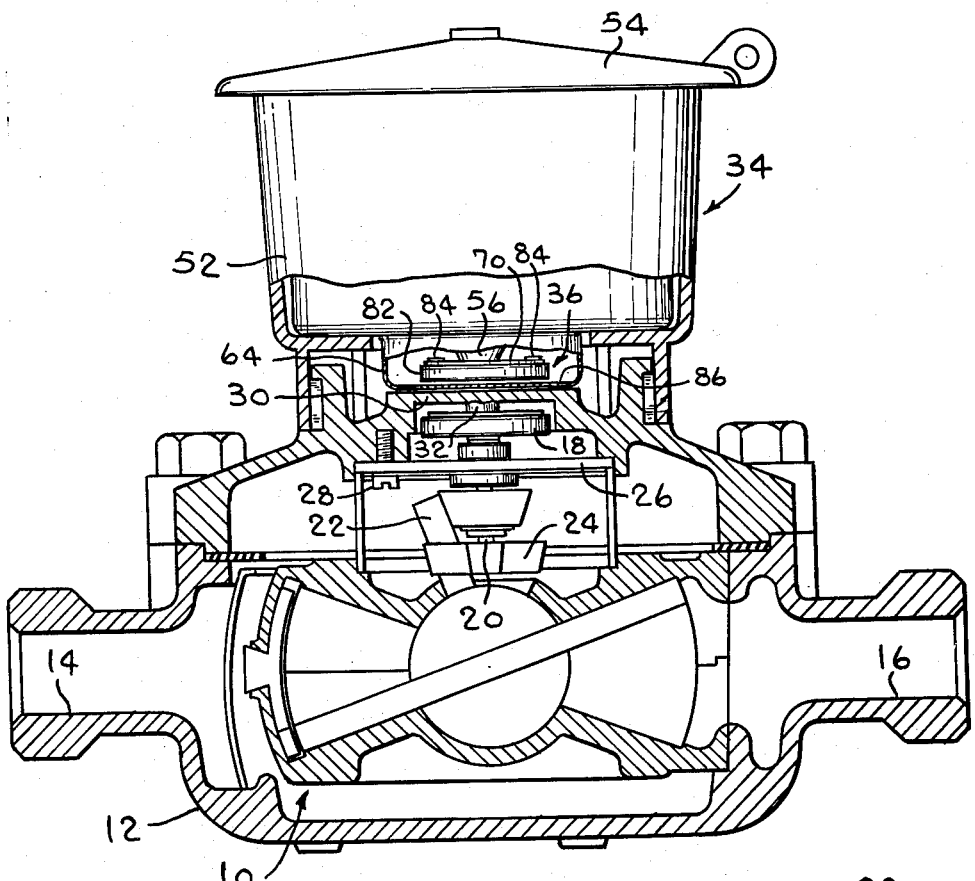

Jan. 7, 1964   D. J. KULLMANN   3,116,640
BEARING STRUCTURE FOR FLUID METER
Filed Nov. 14, 1961   2 Sheets-Sheet 1

INVENTOR.
DONALD J. KULLMANN
BY John W. Michael
ATTORNEY

Jan. 7, 1964     D. J. KULLMANN     3,116,640
BEARING STRUCTURE FOR FLUID METER
Filed Nov. 14, 1961     2 Sheets-Sheet 2

INVENTOR.
DONALD J. KULLMANN
BY *John W. Michael*
ATTORNEY

United States Patent Office 3,116,640
Patented Jan. 7, 1964

3,116,640
BEARING STRUCTURE FOR FLUID METER
Donald J. Kullmann, Milwaukee, Wis., assignor to Badger Meter Manufacturing Company, Milwaukee, Wis., a corporation of Wisconsin
Filed Nov. 14, 1961, Ser. No. 152,347
13 Claims. (Cl. 73—258)

This invention relates to fluid meters and the like wherein motion is transmitted from a measuring unit to a sealed registering unit by a magnetic coupling and more particularly to the bearing supports for the magnetically driven member in the registering unit.

Fluid meters of the type contemplated herein utilize a sealed measuring unit to drive a sealed registering unit which is removably mounted on the housing for the measuring unit. These units are designed for substantially continuous operation and must therefore be relatively service-free. The registering unit includes a gear train which is driven by means of a permanent magnet mounted on the gear train magnetically coupled through the wall of the measuring unit to a similar magnet driven by the measuring unit. The thrust bearing for the driven magnet has been located within the magnetic field of the magnets where it is subject to the influence of magnetic field. Non-magnetic material has therefore been used in the bearing balls and races which is of a relatively soft material subject to considerable wear.

The primary object of this invention is to provide an improved thrust bearing for the registering unit in a fluid meter having a prolonged operating life.

A further object of this invention is to provide an improved magnetically driven assembly which has the thrust bearing located outside of the field of the magnet of the driven member.

These objects are accomplished by mounting a molded graphite plastic plate on the gear train for the registering mechanism to support the driven magnet assembly. The plate is provided with a bearing housing which is designed to provide radial bearing surfaces for the driven magnet assembly and to support the thrust bearing for the assembly. The driven assembly includes a ring-type ceramic permanent magnet mounted on one end of a spindle which is positioned in the bearing housing and held therein by the first pinion gear of the gear train for the registering mechanism which is staked to the opposite end of the spindle. A three-ball type thrust bearing is mounted on the spindle between the pinion gear and bearing housing in a position where it is outside of the magnetic field of the magnet. The spindle is recessed slightly in the center so that it is supported in the bearing housing by the larger diameter sections at its two ends which provide radial bearings for the spindle. This compensates for any imperfections in the axial length of the spindle which may occur during manufacture and reduces friction between the shaft and the bearing surfaces of the housing. The lower end of the spindle extends into the offset center portion of the magnet carrier so that it is located at approximately the mass center of the ring-type magnet to reduce any bending moments created in the spindle by any imbalance in the centrifugal force of the ring magnet. The location of the thrust bearing at a point remote from the magnetic field of the magnets makes it possible to use magnetic materials for the thrust bearing parts. The life of the thrust bearing is therefore appreciably increased since magnetic materials are harder and therefore subject to less wear.

Figure 2:
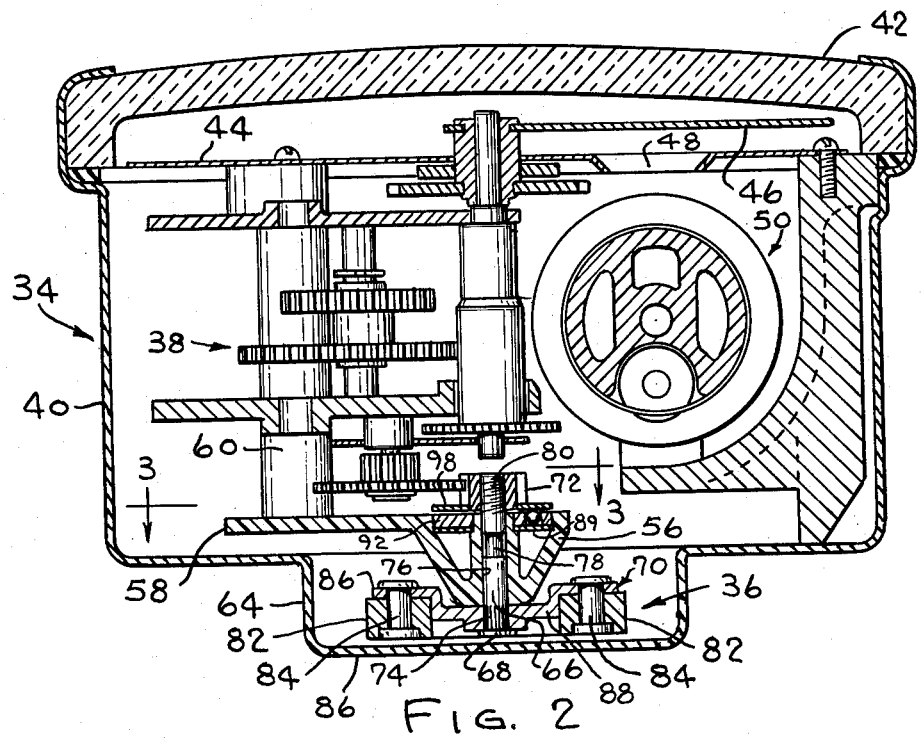
Figure 3:
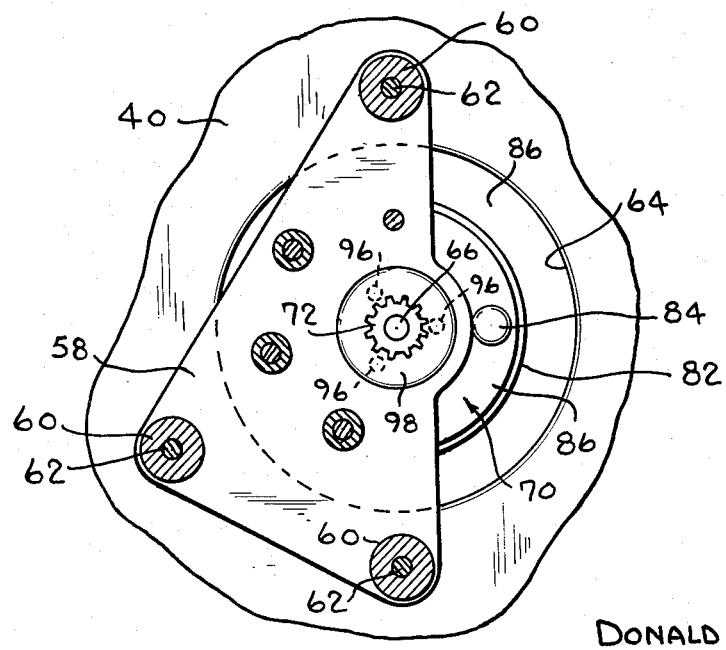

Other objects and advantages will be pointed out in or be apparent from the specification and claims, as will obvious modifications of the single embodiment shown in the drawings, in which:

FIG. 1 is a side view partly in section of a water meter;
FIG. 2 is a side view in section of the registering mechanism;
FIG. 3 is a view of the molded plastic bearing plate;
FIG. 4 is a side view in section of the bearing assembly; and
FIG. 5 is a projection view of the bearing retainer.

Referring to the drawings, a water meter is shown having a nutating disc-type measuring unit 10 contained within a sealed housing 12 having an inlet 14 and an outlet 16. This unit drives a ring magnet 18 rotatably mounted on a shaft 20 by means of a drive spindle 22 which engages a crossbar 24 secured to the lower end of shaft 20. The drive magnet assembly is supported in the housing on a mounting plate 26 which is secured to the housing by a screw 28. The drive magnet is positioned adjacent the upper imperforate wall 30 of the sealed housing with the upper end of shaft 20 seated on a thrust bearing, such as a sapphire jewel, located in the enlarged section 32.

The rotary motion of the drive magnet is transmitted to a driven magnet assembly 36 in a sealed registering unit 34 which is magnetically coupled to the drive magnet. The registering unit includes a gear train generally indicated at 38 sealed within a thin walled container 40 having a transparent window 42 providing a visual view of the position of pointer 46 on the indicia on cover plate 44. The cover plate is apertured at 48 to provide a view of a number wheel counter assembly 50 also driven by the gear train. This container is secured within a protective hood 52 which is removably mounted on the sealed housing and is provided with a cover 54 to completely enclose and protect the register unit.

The drive magnet assembly is mounted in a bearing housing 56 in plastic plate 58 which is molded as a single unit from nylon graphite material. The plate is mounted on the ends of posts 60 in the gear train by screws 62 with the drive magnet assembly positioned within a well 64 in the bottom of the registering unit. The drive magnet assembly includes a spindle 66 having a flange 68 on one end to support a magnet carrier 70 and threaded at the other end to receive the first pinion gear 72 of the gear train. The spindle may be serrated as indicated at 74 to secure the magnet carrier to the spindle. The spindle is inserted into hole 76 in the bearing housing and has a recess 78 at its center so that the spindle is radially supported in the bearing housing by the larger diameter sections 80 and 81 at its ends. The graphite material of the plate provides a radial bearing surface for the ends of the spindle. Any deformation of the spindle is compensated for by the recess thus preventing any rocking of the spindle in the bearing housing.

A four-pole ring-type permanent magnet 82 is secured to flange 86 of the magnet carrier by eyelets 84 and is positioned adjacent the bottom wall 86 of the well. The center 88 of the carrier is offset from the flange so lower radial bearing 81 is approximately located at the mass center of the magnet. The lower radial bearing is larger than bearing 80 to compensate for the larger forces acting on the bearing due to the centrifugal force of the magnet. This also reduces any bending moments created in the spindle by the imbalance of the magnet.

A fixed bearing race 89 is positioned within a recess 90 on the upper end of the bearing housing and a plastic ball retainer 92 is positioned thereon. The ball retainer has a number of holes 94 to hold ball bearing 96 in position on the fixed bearing race. A movable bearing race 98 is mounted on the inner end of the pinion gear and rides on the ball bearings. The end of the spindle may be staked at 100 to permanently secure the gear to the spindle. The ball races and ball bearings are made from magnetic material because they are located at a sufficient distance from the magnets to be outside of the influence of the magnetic field of the magnets.

The location of the thrust bearing at a point remote from the magnetic field of the magnet has increased the life of the thrust bearing to a point where it is practically service-free. The spindle for the driven magnet has been designed to have radial bearing surfaces at its ends which ride on the inner graphite surface of the bearing housing to provide a maintenance free radial bearing for the driven magnet.

Although but one embodiment of the present invention has been illustrated and described, it will be apparent to those skilled in the art that various changes and modifications may be made therein without departing from the spirit of the invention or from the scope of the appended claims.

I claim:

1. A bearing assembly for the driven magnetic assembly of a fluid flow registering device comprising,
   a plate having a bearing housing integrally molded thereon,
   a spindle mounted for rotation in said bearing housing,
   a magnetic member mounted on one end of the spindle,
   a pinion gear secured to the other end of the spindle, and
   thrust bearing means mounted on the spindle between the pinion gear and bearing housing, said thrust bearing means being located outside of the magnetic field of the magnetic member.

2. A bearing assembly for the driven magnetic assembly of a fluid flow registering device comprising, a plate having a bearing housing integrally molded thereon, a spindle mounted for rotation in said bearing housing and including a radial bearing surface at each of its ends and separated by a central recess, a magnetic member mounted on one end of said spindle, a pinion gear secured to the other end of said spindle, and thrust bearing means mounted on the spindle between the pinion gear and bearing housing, said thrust bearing means being located outside of the magnetic field of the magnetic member.

3. A bearing assembly according to claim 2 wherein said magnetic member is offset at its center and one of the spindle radial bearing surfaces extends therein.

4. A bearing assembly according to claim 3 wherein said plate is molded from a nylon graphite material to provide the bearing surface for the radial bearing surfaces of the spindle.

5. A bearing assembly according to claim 4 wherein said thrust bearing means includes a fixed bearing race mounted in said housing, a movable bearing race mounted on said pinion gear, and a disk-type bearing retainer positioned between said bearing races.

6. A bearing assembly for the driven magnetic assembly in a fluid flow regulating device comprising,
   a plate having an integral bearing housing,
   a spindle mounted for rotation in said bearing housing,
   a ring-type permanent magnet,
   means for mounting said magnet on one end of the spindle,
   gear means mounted on the other end of the spindle to hold the spindle in the housing,
   and a three-ball thrust bearing means mounted on the spindle between the gear means and the housing at a sufficient distance to be clear of the magnetic field of the magnet.

7. A bearing assembly for the driven magnetic assembly in a fluid flow regulating device comprising, a plate having an integral bearing housing, a spindle mounted for rotation in said bearing housing, a ring-type permanent magnet, means for mounting said magnet on one end of said spindle, gear means mounted on the other end of said spindle to hold the spindle in the housing, and a three-ball thrust bearing means mounted on the spindle between the gear means and the housing at a sufficient distance to be clear of the magnetic field of the magnet, said thrust bearing means including a first bearing race secured to said housing, a second bearing race secured to said gear means and a three-ball bearing retainer positioned between said races, said races and balls being made from a magnetic material.

8. A bearing assembly according to claim 7 wherein said spindle includes large diameter sections at its ends to provide radial bearings for the spindle with respect to said housing, one of said sections being larger than the other section.

9. A bearing assembly according to claim 8 wherein said large section extends into the magnet holding means to a distance sufficient to be at the mass center of the ring magnet.

10. A bearing assembly according to claim 9 wherein said plate and housing are molded from a nylon graphite material to form the radial bearing surface for the large diameter sections of the spindle.

11. The combination with a fluid flow measuring device having a nutating disc-type fluid flow measuring means including a magnetic drive member and a hermetically sealed registering means including a magnetic driven member, said registering means being mounted on said measuring means with the driven member magnetically coupled to follow the motion of the drive member, of means for supporting the driven member within the sealed register comprising,
    a molded graphite bearing plate mounted in the registering means, said magnetic driven member being mounted for rotation in said plate, said member including a spindle, a ring-type magnet mounted on said spindle on one side of said plate and a pinion gear mounted on the other side of said plate, said plate forming radial bearing surfaces for said spindle,
    and thrust bearing means mounted on said spindle in a position outside of the magnetic field of said magnetic coupling.

12. The combination according to claim 11 wherein said spindle includes radial bearing surfaces at each end cooperating with said plate, one of said bearing surfaces extending substantially through the mass center of said magnet.

13. In a meter including flow measuring means and flow registering means, the combination of a first magnetic member connected to and driven by said flow measuring means, a second magnetic member connected to and driving said flow registering means, said second magnetic member spaced axially from and magnetically coupled with said first magnetic member so that said second magnetic member is driven by said first magnetic member and is subjected to an axial thrust, shaft means supporting said second magnetic member for movement, and thrust bearing means connected to said shaft means in axial spaced relationship from said second magnetic member a distance sufficient to place said thrust bearing means outside of the magnetic field of said magnetic members.

References Cited in the file of this patent
UNITED STATES PATENTS

| 27,139 | Manton et al. | Feb. 14, 1860 |
| 1,724,272 | Ford | Aug. 13, 1929 |
| 2,294,825 | Bassett | Sept. 1, 1942 |
| 2,921,468 | Treff et al. | Jan. 19, 1960 |